Sept. 4, 1951  J. J. TOTH ET AL  2,566,434
CUTTER FOR GLASS TUBES, AMPOULES AND THE LIKE
Filed April 17, 1948
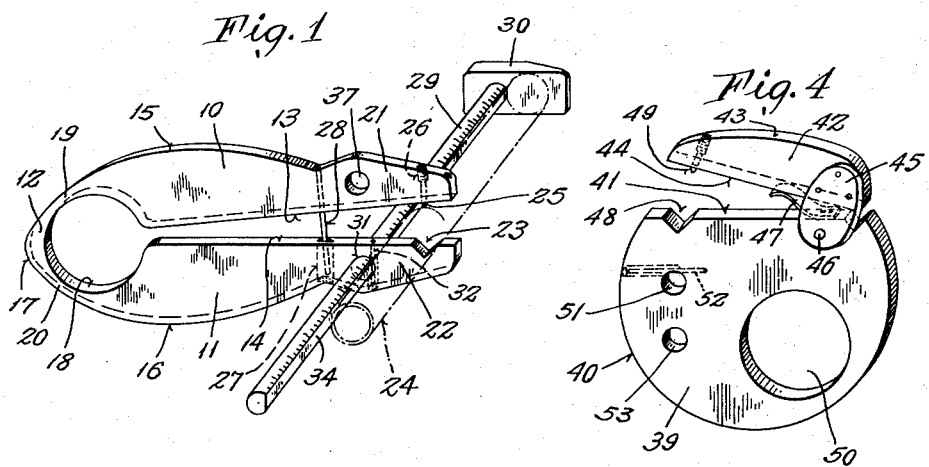
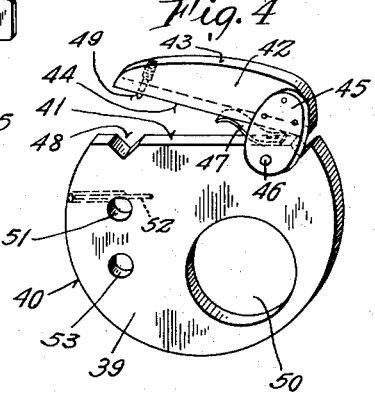
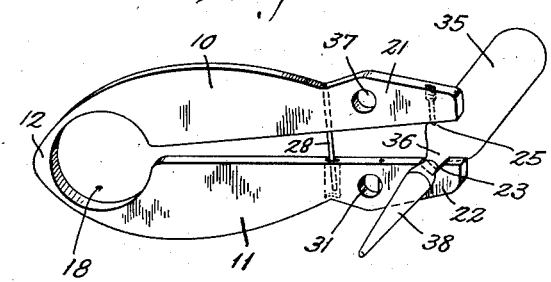
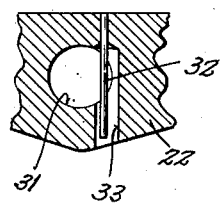
INVENTORS
John J. Toth
BY Robert B. Lewis
Johnson and Kline
ATTORNEYS Patented Sept. 4, 1951

2,566,434

UNITED STATES PATENT OFFICE 2,566,434

CUTTER FOR GLASS TUBES, AMPOULES, AND THE LIKE

John J. Toth, Wilmington, Del., and
Robert B. Lewis, Chester, Vt.

Application April 17, 1948, Serial No. 21,595

3 Claims. (Cl. 49—52)

This invention relates to hand-held and operated cutting devices for glass tubing, vials, ampules and the like.

An object of the invention is to provide an improved small, hand-operated cutting device for scoring glass tubes, ampules, etc., and for fracturing or opening the tubes or ampules, which device is extremely simple in construction and economical to fabricate, while at the same time being very effective in its operation and convenient to use.

Another object of the invention is to provide an improved cutting device as above which is universal in application, being adaptable for use with a wide variety of sizes of tubes, and vials or ampules, as well as with different hardnesses of glass.

A further object of the invention is to provide a tube cutting device as characterized above, which has improved gauge means for predetermining the length of tubing to be cut off.

In accomplishing the above objects there is provided by the invention, in one embodiment thereof illustrated herein, a novel cutter structure formed of a single piece of sheet metal having a pair of cooperable elongate, flat and relatively wide arms disposed edgewise to each other and having an integral, thin-sectioned flexible connection at one pair of corresponding ends. The cooperable arms are coextensive and have at their other ends means including a notch in one arm and a cutter on the other for positioning and scoring a section of glass tubing which is inserted between the arms to extend laterally thereof. Intermediate the ends of the arms simple guide means comprising a pin and slot are provided to maintain the arms in accurate alignment at all times during their relative movements toward and away from each other, and thus an extremely economical and yet effective structure is provided to obtain relatively movable cutter arms.

One of the cooperable arms has adjacent the scoring means an aperture through which a graduated gauge arm passes to extend laterally of the apertured arm, one end of the gauge arm having a stop for engagement with the ends of glass tubing which is to be cut. The graduated gauge arm has a flat surface extending longitudinally thereof, engaged by a wire spring carried on the apertured arm whereby the gauge arm is held in various adjusted positions and is also prevented from turning which might misalign the stop with respect to the tubing to be cut.

The cooperable arms of the device have convex outer longitudinal edges for engagement with the fingers and hand, thereby providing for a convenient and effective grip and making unnecessary the use of auxiliary clamping or pressure devices. Also an aperture is provided in one of the cooperable arms for receiving the end of a scored ampule or tube to facilitate fracture thereof, the tube being merely inserted in the aperture up to the score line whereupon lateral pressure on the tube will cause it to fracture.

In another illustrated embodiment of the invention the cutting structure comprises a flat sheet metal body having the form of a truncated disk, having a large finger opening, the body being shaped and arranged to be conveniently held almost entirely in the hand with one finger passing through the finger opening. A movable jaw in the form of a flat sheet metal strip is pivotally connected to the body to extend along the flat edge thereof, and the said edge and jaw have cooperable means for scoring a section of tubing. The body may carry a gauge device similar to that of the first-mentioned embodiment, and may have an aperture to receive a scored tube for facilitating the fracture thereof.

In all of the embodiments of the invention the means for positioning and scoring the tubing include a notch for accommodating the tubing, which is arranged to position the tubing transverse to the jaws whereby it may be readily held and turned to score the periphery thereof, and the component parts of the cutting devices may be readily formed of sheet metal to provide for economy of manufacture, all of the devices being adapted to be conveniently held in one hand, and to be operated easily and yet effectively.

Other features and advantages will hereinafter appear.

In the accompanying drawings:

Figure 1 is a perspective view of an improved tube and ampule cutter made according to the invention, having gauge means for enabling a glass tube to be cut off in any one of a large number of different predetermined measured lengths.

Fig. 2 is a view like Fig. 1 but without the gauge means, the cutter being shown with a vial or ampule which is to be opened.

Fig. 3 is a detail showing the gauge-supporting portion of the cutter of Figs. 1 and 2 in longitudinal section, to reveal the spring construction thereof.

Fig. 4 is a perspective view of a cutter illustrating a modification adapted to be conveniently held and contained almost completely in one hand.

Referring to Figs. 1 and 2 the tube and ampule cutter shown therein comprises a pair of members 10 and 11 in the form of elongate, flat relatively wide arms located edgewise to each other, said arms being substantially coextensive and having an integral connecting portion 12 at one pair of corresponding ends. The arms 10 and 11 and the connecting portion 12 are preferably formed of a single piece of flat stock such as hard drawn aluminum sheet or the like, and have juxtaposed longitudinal edges 13 and 14 which are substantially straight, and outer edges 15 and 16 which are convex and which together with the outer edge 17 of the connecting portion 12 define an oval or elliptical shape adapted to be conveniently held in the palm of one hand. A large circular aperture 18 is provided in the blank, thereby to form the integral connecting portion 12, and the size of the aperture 18 is such as to provide a pair of thin sections 19 and 20 between the connecting portion 12 and the arms 10 and 11, the thin sections by their flexibility providing the effect of a pivotal connection between the arms. Thus a desirable economy of manufacture is had, since no pivots and the like, or assembly operations are required to make the arms relatively movable.

The arms 10 and 11 have jaw portions 21 and 22 located at the ends opposite to the connecting portion 12, and the jaw portion 22 has a V-notch 23 to accommodate and position a glass tube 24 (shown in dot-and-dash outline). The jaw portion 21 has, mounted in a recess thereof, a cutter 25 which is preferably secured to the end of a screw 26 which is threaded in the said recess. The cutter 25 may be of tungsten carbide (commonly called Carboloy, Kennametal, etc.) or it may be formed of a diamond chip, or any other suitable material.

In accordance with the invention means are provided intermediate the ends of the arms 10 and 11 for guiding the arms during their movements toward and away from each other, to maintain accurate alignment thereof. This means comprises a slot 27 in the arm 11, extending through from the inner longitudinal edge 14 to the outer longitudinal edge 16 thereof, the slot 27 also extending longitudinally of the arm for a short distance as shown, and comprises a projection or pin 28 carried by the arm 10, and entering the slot 27, the pin slidably engaging the walls of the slot and maintaining the arms flat and in a single plane at all times.

For the purpose of predetermining the lengths of the tube 24 which are to be cut off, a novel gauge is provided, comprising a graduated gauge arm 29 having at one end a stop 30 for engagement with an end of the tube 24. The gauge arm 29 extends through an aperture 31 in the jaw portion 22 and is held in adjusted position by a wire spring 32, Figs. 1 and 3, which passes through a part of the aperture 31 and is movable laterally in an enlarged bore 33 in the portion 22.

The spring wire 32 bears against a flat surface 34 on the gauge arm 29, which surface extends longitudinally of the arm and prevents turning of the latter, thereby to maintain the stop 30 in proper position at all times for engagement with the end of the glass tube 24. The wire 32 also holds the gauge arm 29 in its various adjusted positions, and prevents inadvertent removal of the arm from the aperture. It will be understood that the gauge arm 29 may be shifted in the jaw portion 22, and may occupy various positions therein so as to enable the length of tubing which is to be cut off to be determined accurately beforehand.

In operating the tube cutting device, the arms 10 and 11 are grasped in one hand and the tubing which is to be cut off is inserted between the jaws 21 and 22 and positioned in the notch 23 of the latter jaw. The end of the tubing is brought into engagement with the stop 30 of the gauge, which latter has been previously set to the desired position. The arms 10 and 11 are then pressed together and the tubing turned, whereupon a peripheral circular score will be made in the tubing. The tubing is then removed from the cutter, and may be easily fractured in the well-known manner.

Referring to Fig. 2, the improved cutter of the present invention may be used conveniently to open a vial or ampule 35. In accomplishing this, the neck portion 36 of the ampule is placed in the V-notch 23, and the cutter 25 brought to bear on the ampule as the latter is turned. This will cause the neck of the ampule to be scored, whereupon it may be easily fractured. To provide a simple and effective means for facilitating the fracture of the ampule 35, the upper jaw portion 21 is provided with an aperture 37 into which the tip 38 of the ampule may be inserted. When this has been done a slight lateral pressure on the ampule will cause the neck to be fractured at the score line.

An improved cutter illustrating a modification of the invention is shown in Fig. 4. This cutter comprises a body 39 in the form of a flat truncated disk of a size to fit conveniently in the hand, the disk having a circular edge 40 and a flat edge 41 and the latter serving as one of the jaws of the cutter. A movable jaw 42 is provided, in the form of an elongate flat strip having a convex outer edge 43 and a straight inner edge 44 which latter is opposite the straight edge 41 of the body 39. The movable jaw 42 has secured to it a plate 45 which is carried by a pivot pin 46 secured in the body 39, and a leaf spring 47, having reverse bends as shown, is secured to the straight edge 41 of the body 39 to yieldably hold the movable jaw 42 away from the body in the position shown. The edge 41 of the body has a V-notch 48 for receiving and positioning a glass tube or ampule, and a cutter 49 is carried by the jaw 42 in a location opposite the notch 48 for the purpose of scoring the glass tube.

The body 39 has a large finger opening 50 located adjacent the circular edge 40 in such a position that a finger of one hand may be passed through the opening 50 and the major portion of the body 39 may be carried in the said hand. Thus, by the provision of the finger aperture 50, together with the size and circular shape of the body 39, the supplementing of such shape by the movable jaw 42, the cutter may be conveniently supported in the hand and the jaw 42 operated to score the glass tube or ampule.

The body 39 has an aperture 51 and a wire spring 52 to accommodate and position a gauge such as the gauge 29, 30 shown in Fig. 1. A second aperture 53 is provided in the body 39 for receiving the end of an ampule or tube which has been scored, to facilitate the fracture of the tube.

Variations and modifications may be made within the scope of this invention and portions of the improvements may be used without others.

We claim:

1. A device adapted to be held almost entirely within the hollow of the hand for scoring a glass tube or the like, comprising a body in the form of a flat plate having the general shape of a truncated circular disk with a substantially straight edge constituting a stationary jaw, said plate having a large aperture adjacent a circular edge to admit a finger of the hand whereby the major portion of the plate may be disposed and carried within the hand; a movable jaw comprising an elongate strip having opposite substantially straight and convex longitudinal edges, said strip at one end being pivotally connected to the plate adjacent one end of the straight edge thereof, whereby the strip is movable toward and away from the plate, the straight edges of the plate and strip being in opposed relation, and one of said edges having a notch to accommodate the glass tube; a cutter on the other straight edge, opposite the said notch; and spring means yieldably holding the strip and plate in separated relation.

2. A device for scoring a piece of glass tubing or the like, comprising a pair of elongate, relatively movable arms disposed alongside each other, said arms being connected together at one pair of corresponding ends for substantially pivotal movement; means located intermediate the ends of the arms for guiding and aligning the arms in their movements toward and away from each other; a cutter for scoring glass, located adjacent the other pair of corresponding ends of the arms and carried by one arm, the other arm having a notch opposite the cutter to accommodate and position the glass tubing whereby when the arms are forced together on the tubing and the latter is turned it will be positioned by the notch and the periphery of the tubing will be scored by the cutter, a gauge comprising a graduated arm and a stop carried by the arm for engagement with the end of the glass tubing; and means for mounting the gauge arm on one of said pair of arms to extend laterally thereof, said means enabling the gauge arm to be adjustably positioned whereby the score line made in the glass tubing may be located at any one of different predetermined measured distances from the said end of the tubing.

3. A device of the type described, comprising a pair of cooperable jaw members movable toward and away from each other; a cutter for scoring glass carried by one of said jaw members, the other jaw member having a notch opposite the cutter to accommodate and position the glass tubing whereby when the jaws are forced together on the tubing and the latter is turned it will be positioned by the notch and the periphery of the tube will be scored by the cutter; a gauge comprising a graduated arm and a stop carried by the arm for engagement with one end of the glass tubing; and means for mounting the gauge arm on one of said pair of jaw members to extend laterally thereof, said means enabling the gauge arm to be adjustably positioned whereby the score line made in the glass tubing may be located at any one of different predetermined measured distances from the said end of the tubing.

JOHN J. TOTH.
ROBERT B. LEWIS.

REFERENCES CITED

The following references are of record in the file of this patent:

UNITED STATES PATENTS

| Number | Name | Date |
|---|---|---|
| 454,233 | Smith | June 16, 1891 |
| 476,626 | Fowler, Jr. | June 7, 1892 |
| 946,414 | Wikander | Jan. 11, 1910 |
| 1,170,588 | Wells | Feb. 8, 1916 |
| 1,538,903 | Ogint | May 26, 1925 |
| 2,224,354 | Maxwell | Dec. 10, 1940 |
| 2,410,901 | Ramsey | Nov. 12, 1946 |
| 2,447,988 | Pierson | Aug. 24, 1948 |

FOREIGN PATENTS

| Number | Country | Date |
|---|---|---|
| 3,607 | Great Britain | Mar. 28, 1891 |
| 608,020 | France | July 13, 1926 |